Patented Mar. 13, 1934

1,950,899

UNITED STATES PATENT OFFICE 1,950,899

MANUFACTURE OF HYDROCYANIC ACID

Cornelius J. Marvin and Mark Walker, South Pasadena, Calif., assignors, by mesne assignments, to E. I. du Pont de Nemours and Company, a corporation of Delaware No Drawing. Application May 14, 1931, Serial No. 537,495

5 Claims. (Cl. 23—151)

This invention relates to chemical processes where hydrocyanic acid as liquid or vapor is present. This application is a continuation in part of a copending application by one of us (Walker) Ser. No. 351,466, filed March 30, 1929 and issued May 3, 1932, as U. S. P. 1,856,606.

The manufacture and storage of hydrocyanic acid or hydrogen cyanide and other processes in which this substance is present have heretofore been attended by various difficulties arising from the tendency of this acid to hydrolyze, decompose, and polymerize. The decomposition products are solids and collect in various parts of the manufacturing equipment to such extent that it becomes necessary to stop the process and clean the equipment. The decomposition products are difficult to remove and also contaminate the product, coloring it yellow or brown. Their presence also apparently catalyzes further polymerization. In the manufacture of hydrocyanic acid, particularly from metal cyanides, hydrolysis and decomposition occurs in solution as well as in the gaseous and liquid hydrocyanic acid produced.

It has previously been proposed to purify hydrocyanic acid from sulphides by adding sulpuhr dioxide thereto. In the above mentioned copending application it has also been shown that the addition of sulphur dioxide to pure hydrocyanic acid has a stabilizing effect thereon. In spite of these improvements, it has still been necessary to periodically close down manufacturing units in which hydrocyanic acid was being made from metal cyanides and acids because polymers formed therein.

One object of this invention is to produce hydrocyanic acid from raw materials reacting to produce the same without any substantial decomposition or polymerization of either raw materials or product. A further object is to continuously manufacture stable, water white hydrocyanic acid.

These objects are attained by maintaining stabilizing amounts of sulphur dioxide with the hydrogen cyanide at all stages of preparation.

One method of carrying out our invention may be described with reference to the process for making hydrocyanic acid by reacting a metal cyanide with an acid. A small amount of a metal sulfite is added to the cyanide or its solution prior to the treatment with acid. The sulfite and cyanide simultaneously react with the acid to produce a mixture of sulfur dioxide and hydrocyanic acid vapor. Sulphur dioxide in stabilizing amounts is thus caused to be present as soon as the reaction is begun and prevents decomposition of the hydrocyanic acid vapor during subsequent operations such as purification, drying and condensing. The sulphur dioxide present in the vapor is entirely dissolved in the condensed liquid hydrogen cyanide and acts to stabilize it. Furthermore, the sulfite in solution also prevents decomposition in the cyanide solution prior to its reaction. This process is also a convenient means of securing the sulphur dioxide purification of U. S. P. 1,571,982 and may be used as the means of securing the stabilizing amounts of sulphur dioxide in liquid hydrogen cyanide according to Ser. No. 351,466.

Any desired amount of sulfur dioxide may be generated during the reaction of the cyanide and acid, but we prefer to generate an amount equivalent to 0.05%–0.5% by weight of the hydrocyanic acid produced. Such amounts confer satifactory stability. If the proportion of sulfur dioxide generated is larger than is desired in the product, it may be partially removed during the purification process.

The following example further illustrates the invention as applied to a continuous process.

Example

Batches of cyanide solutions were made as needed by dissolving 2000 pound lots of 85–98% sodium cyanide in 675 gallons of water to which 2 pounds of anhydrous sodium sulfite dissolved in 3 gallons of water had previously been added. The cyanide-sulfite solution thus prepared was continuously reacted with sulfuric acid solution by mixing streams of the two reactants. The evolved hydrocyanic acid vapor, containing around 0.1% of sulfur dioxide, was continuously subjected to a purification and dehydrating process, which did not remove substantial amounts of the sulfur dioxide, and finally was condensed to a liquid. The process was operated substantially continuously for more than 3 months with practically no formation of hydrocyanic decomposition products. The liquid hydrocyanic acid produced was water white and stable.

The invention is not limited to the particular source of sulphur dioxide shown nor to the disclosed method of its addition. Other sources and methods may be employed and are embraced within the scope of this invention so long as sulphur dioxide is maintained in stabilizing amounts in the reacting system; that is, sulphur dioxide should be present in stabilizing amounts when the hydrocyanic acid is formed and is preferably maintained at such concentrations in said acid thereafter. We have, for instance, obtained satisfactory results by introducing sulfur dioxide gas evaporated from the liquid stored in cylinders.

Our invention is not restricted to the manufacture of hydrocyanic acid from metal cyanides, but may be employed in any process for making this acid, for example, in the dehydration of formamide to form hydrogen cyanide and water.

Without limiting the invention but to clarify the same it may be stated that the unexpected improvement found here is, we believe, due to the autocatalytic nature of hydrocyanic acid decomposition and/or polymerization. By incorporating stabilizer before formation, the initial polymer formation is retarded and hence control of the process of manufacture, handling and storage of hydrocyanic acid is facilitated by operating in a system where hydrogen cyanide polymerization is never allowed to gain headway.

An advantage of our invention is that by its use it is possible to operate for practically unlimited periods of time processes involving the production of free hydrocyanic acid with no substantial formation of decomposition products. This results in cheaper and more satisfactory operation, better yields and a higher grade of product than was possible heretofore. A further advantage is that by using our invention in the manufacture of hydrocyanic acid, a superior product may be obtained which contains sufficient sulfur dioxide to prevent its later decomposition in storage.

We claim:

1. Method for the production of stable hydrocyanic acid vapor mixture which comprises providing an aqueous solution of a metal cyanide containing a metal sulphite in an amount substantially less than the molecular equivalent of the metal cyanide and reacting the said aqueous solution with an acid to simultaneously evolve hydrogen cyanide and sulphur dioxide.

2. A process for producing a mixture of hydrocyanic acid and sulphur dioxide comprising reacting with an acid a mixture comprising a metal cyanide and a metal sulphite, the proportion of metal sulphite in said mixture being substantially less than the molecular equivalent of the metal cyanide.

3. A process for producing hydrocyanic acid containing stabilizing amounts of sulphur dioxide which comprises reacting with an acid a mixture comprising an alkali metal cyanide and a metal sulphite, the proportion of metal sulphite in said mixture being substantially less than the molecular equivalent of the metal cyanide; and maintaining stabilizing amounts of sulphur dioxide in the hydrocyanic acid collected therefrom.

4. A process for producing hydrocyanic acid comprising reacting with an acid a mixture comprising sodium cyanide and a metal sulphite, the proportion of metal sulphite in said mixture being substantially less than the molecular equivalent of the metal cyanide; and maintaining 0.05 to 0.5% by weight of sulphur dioxide in the hydrocyanic acid collected therefrom.

5. A process for producing hydrocyanic acid comprising reacting with an acid a sodium cyanide solution containing 0.0002 to 0.002 moles of a metal sulphite per mole of sodium cyanide.

CORNELIUS J. MARVIN.
MARK WALKER.